Patented Aug. 21, 1945

2,383,361

UNITED STATES PATENT OFFICE 2,383,361

STABILIZING CELLULOSE ETHERS

Shailer L. Bass and Lawrence A. Rauner, Midland, and Paul H. Lipke, Jr., Bay City, Mich., assignors to The Dow Chemical Company, Midland, Mich., a corporation of Michigan No Drawing. Application May 5, 1943,
Serial No. 485,756

9 Claims. (Cl. 106—186)

This invention relates to a method for stabilizing cellulose ethers and to the improved composition thereby obtained.

It is known that organo-soluble cellulose ethers become degraded on prolonged exposure to heat and that the rate of degradation increases rapidly with rise in temperature. Such degradation causes a change in the properties of the ether, such as a decrease in its dielectric strength and a gradual loss of flexibility and toughness until eventually an extremely brittle stage is reached.

Although many of the ethers of cellulose are excellent dielectrics and should find extensive use as such, their application has heretofore been limited on account of their instability at high temperatures. This has been a particular disadvantage in the case of high ethoxy ethyl cellulose, i. e. of ethyl cellulose of ethoxy content of about 51 per cent or higher, which, in addition to having excellent dielectric properties and being soluble in lower cost solvents than are the ethers of lower ethoxy content, has a higher melting point than the latter and should, were it not for its heat-instability, be particularly useful as an electrical insulator under conditions of exposure to high temperature. However, due to its sensitivity to heat the use of such high ethoxy ethyl cellulose has heretofore been limited to low temperature applications where its high melting point is no advantage. The same has been true of other high melting cellulose ethers.

The sensitiveness of the cellulose ethers to high temperatures is also a disadvantage when they are used in thermoplastic molding compositions because during the short period of heating to above the melting point in the molding operation considerable change in properties may occur. This is particularly true of the high melting ethers, such as the high ethoxy ethyl cellulose just referred to.

We have found that the heat-stability of a cellulose ether or of a composition comprising a cellulose ether may be improved greatly by incorporating therewith a minor proportion of a compound having the general formula:

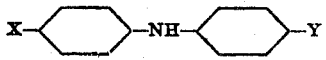

wherein X is a member of the group consisting of hydrogen, hydroxyl and alkoxyl radicals having a straight chain of 1 to 4 carbon atoms inclusive, and Y is a member of the group consisting of hydroxyl, arylamino, arylsulfonylamino, and alkoxyl radicals having a straight chain of 1 to 4 carbon atoms inclusive. The so-formed stabilized composition exhibits a remarkable and unexpected retention of flexibility, tensile strength, and impact resistance even after prolonged and repeated exposure to temperatures in the region of its melting point. Electrical insulators prepared from the stabilized composition are characterized by their high retention of dielectric strength and lack of brittleness after extended usage in locations where they are subject to elevated temperatures. Plasticizers, mold lubricants, pigments, fillers and other modifying agents may be included in the composition, if desired, without seriously interfering with the action of the stabilizer.

We have also found that the stabilized composition undergoes a remarkable change in solubility when heated. Although the heat treated stabilized composition is swollen to a greater or lesser degree by a number of solvents, it is substantially insoluble in, or soluble only after prolonged contact with, most, if not all, of the solvents in which the stabilized but unheated composition dissolves quickly. This is the more surprising because the insolubilization occurs at temperatures below the melting point and without substantial loss of flexibility, impact resistance, or tensile strength of the composition. Although the nature of the change leading to the insolubilization of the composition is not well understood, it may be pointed out that the effect is of advantage because it permits the formation of shaped articles, such as insulators, by extrusion or injection or by solvent casting which, after heat treating or after a short period of use at elevated temperatures, become very resistant to the action of solvents, such as alcohols, aromatic hydrocarbons, low boiling aliphatic hydrocarbons, heavy greases, etc. Consequently, such stabilized and heat treated articles are of much wider application than are the corresponding but unstabilized cellulose ether compositions both because of their heat-stability and because of their resistance to solvents. The term "insolubilized" as herein used to characterize the heated composition of the invention means that the composition is substantially insoluble in solvents in which cellulose ether compositions are usually considered to be soluble, or soluble only after a prolonged period of contact with the solvent during which the composition is swollen slowly by the solvent.

Although the invention is applicable to any of the organo-soluble alkyl and aralkyl ethers and mixed ethers of cellulose, such as the methyl, ethyl, methyl ethyl, propyl, methyl propyl, propyl ethyl, and benzyl ethers, it is of particular advantage in the case of ethers of high melting point, e. g. of ethyl cellulose having an ethoxy content of about 51 per cent or higher, which, due to their heat-instability have not heretofore been usable at elevated temperatures where their higher melting points would be of advantage. Stabilized compositions of the invention have, however, been heated at 175–180° C. for as long as 100 hours without appreciable change in dielectric strength, flexibility, tensile strength, or impact resistance.

Among the stabilizers of the class described which may be mentioned are 4-hydroxy diphenylamine, 4.4'-dihydroxy diphenylamine, 4-hydroxy-4'-methoxy diphenylamine, 4-hydroxy-4'-ethoxy diphenylamine, 4-hydroxy-4'-butoxy diphenylamine, 4-ethoxy diphenylamine, 4.4'-dimethoxy diphenylamine, 4-ethoxy-4'-butoxy diphenylamine, 4-benzenesulfonylamino diphenylamine, 4-paratolylsulfonylamino diphenylamine, 4-methoxy-4'-benzene-sulfonylamino diphenylamine, 4-methyl-4'-paratolylsulfonylamino diphenylamine, 4-phenylamino diphenylamine, 4-tolylamino diphenylamine, and 4-phenylamino-4'-ethoxy diphenylamine. A number of the stabilizers mentioned are available commercially either in pure form or as mixtures, such as Thermoflex, 4.4'-dimethoxy diphenylamine, and Thermoflex "A," a mixture consisting of 25 per cent by weight of 4.4'-dimethoxy diphenylamine, 25 per cent of phenylnaphthylamine, and 50 per cent of 4-phenylamino diphenylamine. Such mixtures of the stabilizers are frequently of particular advantage when a maximum degree of insolubilization of the composition is desired. From 0.05 to 5 per cent, preferably from 0.1 to 1.5 per cent, by weight of the stabilizer may be included in the composition to advantage. Although larger amounts of the stabilizer may be used, if desired, little advantage is gained thereby. Generally speaking larger proportions of the stabilizer are included in the composition when a maximum degree of insolubilization is desired than when it is desired only to produce a composition which retains in large degree its flexibility, tensile strength and impact resistance after exposure to elevated temperatures.

The stabilizer may be incorporated with the cellulose ether in any convenient manner. Thus, in the preparation of lacquers or film-casting solutions, the stabilizer may simply be dissolved in the solvent along with the other ingredients. In the case of compositions prepared by kneading, colloiding or malaxing, the stabilizer may be added during the mixing operation or it may, if desired, be first incorporated with one of the ingredients of the composition and this mixture then used in preparing the final composition. Other ways of incorporating the stabilizer with the cellulose ether will be apparent to those skilled in the art.

Any of the plasticizers usually employed in plasticizing cellulose ethers or mixtures thereof may be employed in plasticizing amounts in the composition. Among these may be mentioned the organic phosphates, plasticizing resins, esters of 12-hydroxystearic acid, esters of ricinoleic acid, high boiling halo-hydrocarbons, esters of phthalic acid, castor oil, esters of stearic acid and plasticizing amides. Pigments, dyes, mold release agents and other modifying agents may be included, if desired.

Maximum insolubilization of the stabilized composition occurs only after several hours heating at an elevated temperature, the time of heating necessary depending to some extent upon the temperature. In general, the higher the temperature at which the composition is heated the less the time which is required to insolubilize the composition. Heating is usually, but not necessarily, carried out at a temperature above about 100° C. and for from 30 to 150 hours, it being understood that lower temperatures and a longer time or higher temperatures and a shorter time may be employed if desired. The heating is preferably, although not necessarily, carried out at a temperature below the melting point of the composition.

Certain advantages of the invention may be seen from the following examples which are given merely by way of illustration and are not to be construed as limiting. The intrinsic viscosity of the ethyl cellulose referred to in the examples is the viscosity, expressed in centipoises, as determined at 25° C. in the Ubbelohde viscosimeter of a 5 per cent solution of the ethyl cellulose in a mixture of 80 parts by volume of toluene and 20 parts of ethanol.

Example 1

Portions of organo-soluble benzyl cellulose, propyl ethyl cellulose, methyl cellulose, and ethyl cellulose of 45.3 per cent ethoxy content were dissolved separately in a mixture of 67 per cent of benzene and 33 per cent of ethanol and films about 0.004 inch thick were cast from each of the solutions. Similar films were cast from solutions containing each of the above ethers together with (a) a plasticizer, (b) a plasticizer plus a minor proportion of a heat-stabilizer, and (c) a minor proportion of the heat-stabilizer alone. For comparative purposes the same plasticizer, 2-ethylhexyl-12-hydroxystearate, and the same stabilizer, Thermoflex A, were used with each ether. The several films, which were each very flexible after stripping from the casting table, were each heated in an oven and inspected at intervals for flexibility and for solubility in a number of solvents and solvent mixtures. Flexibility was determined by handling and solubility was determined by immersing a portion of the film at ordinary room temperature in the particular solvent in which its solubility was being determined.

The ingredients and proportions of each in the several films, the temperature and time of heating, the relative flexibility, and solubility of the heated films are given in Table 1. Each of the films before heating was quickly soluble in each of the solvents used except in the case of gasoline in which each of the films dissolved after a short time during which they become considerably swollen by the gasoline. The solvents and solvent mixtures used are designated in Table 1 by letters as follows: A=a mixture of 80 parts by volume of toluene and 20 parts of ethanol; B=a mixture of 67 parts by volume of benzene and 33 parts of ethanol; C=benzene; D=toluene; E=ethanol; and F=gasoline.

essary to break the bar. A number of bars of each size and composition were heated in an oven at 120° C. for 7 days and then tested in the same

*Table 1*

| No. | Composition of film | | | | Conditions of heating | | Properties of heat treated film | | | | | | |
|---|---|---|---|---|---|---|---|---|---|---|---|---|---|
| | Cellulose ether | Parts by weight of ether | Parts by weight of plasticizer | Parts by weight of stabilizer | Time in hours | Temp. in °C. | Flexibility [1] | Solubility in [2]— | | | | | |
| | | | | | | | | A | B | C | D | E | F |
| 1 | Benzyl | 100 | | | 24 | 120 | Poor | S | S | S | S | GS | GS |
| 2 | ....do | 90 | 10 | | 24 | 120 | ....do | S | S | S | S | GS | GS |
| 3 | ....do | 90 | 10 | 2 | 100 | 120 | Good | I | I | GS | GS | I | I |
| 4 | ....do | 98 | | 2 | 100 | 120 | ....do | I | I | GS | GS | I | I |
| 5 | Propyl ethyl | 100 | | | 24 | 120 | Poor | S | S | S | S | GS | GS |
| 6 | ....do | 90 | 10 | | 24 | 120 | ....do | S | S | S | S | GS | GS |
| 7 | ....do | 90 | 10 | 2 | 100 | 120 | Good | I | I | GS | GS | I | I |
| 8 | ....do | 98 | | 2 | 100 | 120 | ....do | I | I | GS | GS | I | I |
| 9 | Methyl | 100 | | | 24 | 160 | Poor | S | S | S | S | GS | GS |
| 10 | ....do | 90 | 10 | | 24 | 160 | ....do | S | S | S | S | GS | GS |
| 11 | ....do | 90 | 10 | 2 | 100 | 160 | Good | I | I | GS | GS | I | I |
| 12 | ....do | 98 | | 2 | 100 | 160 | ....do | I | I | GS | GS | I | I |
| 13 | Ethyl | 100 | | | 24 | 160 | Poor | S | S | S | S | GS | GS |
| 14 | ....do | 90 | 10 | | 24 | 160 | ....do | S | S | S | S | GS | GS |
| 15 | ....do | 90 | 10 | 2 | 100 | 160 | Good | I | I | GS | GS | I | I |
| 16 | ....do | 98 | | 2 | 100 | 160 | ....do | I | I | GS | GS | I | I |

[1] Films whose flexibility is described as "good" could be folded and creased without any sign of breaking or cracking.
Films whose flexibility is described as "poor" were very brittle and shattered easily when handled.
[2] S=quickly soluble; I=insoluble; GS=swells slowly and dissolves only after 3–4 hours contact with solvent.

EXAMPLE 2

A lacquer was prepared by dissolving 82 parts by weight of ethyl cellulose having an ethoxy content of 52 per cent, 18 parts of 2-ethyl-hexyl stearate and 1 part of Thermoflex A in a mixture of 95 per cent by volume of toluene and 5 per cent of ethanol. An ignition cable was coated with several coats of the lacquer and the coating allowed to dry. The dried coating was about 0.010 inch thick. The coated cable withstood severe tests for dielectric strength after being heated at 150° C. for 100 hours and showed no signs of brittleness or tendency to crack when the cable was flexed sharply. A similar coating, but with the Thermoflex A omitted, became very brittle, was cracked easily and showed very low dielectric strength after heating at 150° C. for 24 hours.

EXAMPLE 3

The following compositions, designated as A and B, were formed by malaxing the ingredients together in the proportions noted. The ethyl cellulose used in each composition had an ethoxy content of 45.8 per cent and an intrinsic viscosity of 184 centipoises.

Parts by weight
A. Ethyl cellulose _____ 82
   2-ethylhexyl-12-hydroxystearate _____ 18
B. Ethyl cellulose _____ 84
   2-ethylhexyl-12-hydroxystearate _____ 15
   Thermoflex A _____ 1

The plastic mixes A and B were formed in an injection molding machine operating at about 350° F. into test bars having dimensions of ½ by ½ by 2½ inches. Impact resistance was determined on both notched and unnotched bars at 70° C. using the Tinius-Olsen impact machine. The impact resistance was recorded in inch-pounds of energy necessary to break the test bar. Tensile strength was determined on similarly formed bars ¼ by 1/16 by 2 inches using a Steel City tensile machine. Tensile strength was recorded in pounds per square inch of cross-section of the bar necmanner for impact resistance and tensile strength. The average impact resistance and tensile strength of a number of both the heated and unheated test bars are recorded in Table 2.

*Table 2*

| Composition | Impact resistance | | | | Tensile strength | |
|---|---|---|---|---|---|---|
| | Unheated | | Heated | | | |
| | Notched | Un-notched | Notched | Un-notched | Un-heated | Heated |
| A | 7.6 | 26.6 | 2.2 | 13.2 | 7,180 | (¹) |
| B | 13.1 | 32.8 | 13.9 | 26.5 | 6,900 | 7,100 |

[1] Too brittle to test.

EXAMPLE 4

A solution of ethyl cellulose in a mixture of 67 parts by volume of benzene and 33 parts of ethanol was divided into several portions and 3 of these portions were treated respectively with 4.4'-dihydroxy diphenylamine, 4.4'-dimethoxy diphenylamine, 4-phenylamino diphenylamine, and 4-methyl - 4' - paratolylsulfonylamino diphenylamine. An amount of each stabilizer was used equal to 5 per cent of the weight of the ethyl cellulose in the portion of the solution treated with the stabilizer. Films about 0.004 inch thick were cast from each of the solutions. For comparative purposes a film was cast from a portion of the ethyl cellulose solution containing no stabilizer. The several films, which were each very flexible after stripping from the casting table, were heated in an oven at 160° C. The film which contained no stabilizer was extremely brittle after heating and shattered readily when handled. Each of the heated films containing a stabilizer were as flexible as before they were heated. The time of heating and the solubility of the heated films in certain of the solvents and solvent mixtures used in Example 1 are given in the accompanying Table 3.

*Table 3*

| No. | Stabilizer | Hours heated at 160° C. | Solubility [1] of heated films in— | | | |
|---|---|---|---|---|---|---|
| | | | B | C | E | F |
| 1 | None | 100 | S | S | GS | GS |
| 2 | 4-methyl-4'-paratolyl-sulfonylamino diphenylamine | 73 | S | GS | GS | GS |
| 3 | 4-phenylamino diphenylamine | 100 | GS | GS | GS | GS |
| 4 | 4,4'-dimethoxy diphenylamine | 100 | S | GS | GS | GS |
| 5 | 4,4'-dihydroxy diphenylamine | 100 | I | I | I | I |

[1] S=quickly soluble; I=insoluble; GS=swells slowly and dissolves only after 3–4 hours contact with solvent.

We claim:

1. A process for insolubilizing and stabilizing cellulose ether compositions soluble in organic solvents and subject to deterioration by heat whereby they become less soluble in such solvents and less subject to such deterioration which comprises dispersing therein a compound having the general formula:

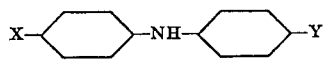

wherein X is a member of the group consisting of hydrogen, hydroxyl and alkoxyl radicals having a straight chain of 1 to 4 carbon atoms inclusive, and Y is a member of the group consisting of hydroxyl, arylamino, arylsulfonylamino, and alkoxyl radicals having a straight chain of 1 to 4 carbon atoms inclusive, and heating the mixture.

2. A process as claimed in claim 1 wherein the compound incorporated in the cellulose ether composition is 4.4'-dimethoxy diphenylamine.

3. A process as claimed in claim 1 wherein the compound incorporated in the cellulose ether composition is 4-phenylamino diphenylamine.

4. A process as claimed in claim 1 wherein the mixture is heated for from 30 to 150 hours at a temperature between 100° C. and the melting point of the composition.

5. A cellulose ether composition of reduced solubility in organic solvents and improved thermal stability, identical with that produced according to the method of claim 1.

6. A cellulose ether composition of reduced solubility in organic solvents and improved thermal stability, identical with that produced according to the method of claim 1, wherein the cellulose ether is ethyl cellulose.

7. A cellulose ether composition of reduced solubility in organic solvents and improved thermal stability, identical with that produced according to the method of claim 1, wherein the cellulose ether is ethyl cellulose having an ethoxy content of at least 51 per cent.

8. A cellulose ether composition of reduced solubility in organic solvents and improved thermal stability, identical with that produced according to the method of claim 1, wherein the diaryl amine compound is 4.4'-dimethoxy diphenylamine.

9. A cellulose ether composition of reduced solubility in organic solvents and improved thermal stability, identical with that produced according to the method of claim 1, wherein the diaryl amine compound is 4-phenylamino diphenylamine.

SHAILER L. BASS.
LAWRENCE A. RAUNER.
PAUL H. LIPKE, JR.